2,936,237
PROCESS OF PREPARING MILK PRODUCTS

Adam Schmidt-Burbach, Berlin, and Walther Kundrat, Freising, Germany

No Drawing. Application September 17, 1956
Serial No. 610,420

Claims priority, application Germany September 22, 1955

11 Claims. (Cl. 99—59)

This invention is for improvements in or relating to the preparation of milk products.

It is known that the intestines and other mucous membranes harbour a flora of bacteria which thrive in symbiotic harmony and which carry out important functions that are of advantage to their host. The balance of this flora which is of equal importance to animals and man can be disturbed by various causes, and more particularly by foodstuffs containing other bacteria, such as sour milk (buttermilk or yoghourt milk) if the products of metabolism of these other bacteria happen to be antagonistic to the normal gut flora.

The present invention relates to the selection and cultivation of certain types of bacteria taken from the community of the useful bacteria comprised in the gut flora, which adapt the milk and milk products to the conditions prevailing in the human intestine and will not therefore impair but rather will assist the existing symbiosis between the different types of gut bacteria and the mucous membrane.

The selection of bacteria for sour milk is based on the principle that the products of metabolism in sour milk must not be antagonistic to the normal physiological gut flora (as is the case for instance with *Thermobacterium bulgaricum*, the principal starter of yoghourt), but must be symbiotic. This is chiefly the case with those lactic acid bacteria which physiologically belong to the gut flora group. Such an organism, for instance, is *Thermobacterium intestinale* (synonym: *acidophilus, Moro bacilli*). This bacillus has been repeatedly suggested and even used for the preparation of sour milk. However, it has the peculiarity of adapting itself quickly to the milk and of undergoing profound biological changes so that one speaks of a lactic acid variant of *acidophilus*. This mutation of *acidophilus* fails to harmonise with the symbiotic community of the gut flora. Consequently, the Moro bacteria that have been derived from the intestinal membrane must be cultivated in such a way that the qualities which are characteristic of the gut variety (maltose fermentation, resistance to indene, scatole, phenol and the salts of bile acid, as well as gram-sensitivity) are retained. Only if care is taken that this is so will these bacteria continue to be compatible with intestinal symbiosis.

The selection of cultures is therefore determined by their reaction towards the most important representative of the gut flora, namely *Bact. coli*, the desirable strains of which must on no account be impaired by sour milk.

A further feature of the invention consists in that the useful bacteria of the intestinal mucous membrane or other mucous membranes are segregated and symbiotically further cultivated in milk, whey or other milk products, at temperatures between 30° and 50° C. in such a manner that the bacteria will continue to retain the characteristics of the intestinal variant, with the purpose in view of re-establishing these symbions, through the agency of milk, whey or other milk products, in the intestine where they can then help in maintaining, improving or restoring the normal intestinal flora. By symbiotically cultivating these bacteria it is further possible to impart to the milk products inoculated therewith the desired taste and consistency, to prevent excessive acidification, and at the same time to protect these milk products from undesirable microorganisms.

It has been found to be of especial advantage to use freshly cultivated intestinal strains of *Thermobacterium intestinale* (*Lactobacillus acidophilus*) and *Bacterium bifidum* (*Lactobacillus bifidus*) individually or jointly in symbiosis with one or more of the following species.

(a) Lactose or torulopsis yeasts and/or oospora races;
(b) Certain streptococci, more particularly from taette (Finnish viscous or long milk);
(c) Propionic acid bacteria.

It was also found that the desired function of bacterial symbiosis with the intestinal mucous membrane, and the development and biological activity of the bacteria can be further promoted by an addition of trace elements, such as cobalt chloride, vitamins and growth factors.

The following examples serve to illustrate the invention and the manner in which it may be carried into effect.

Example 1

*Thermobacterium intestinale* of the types A, B, C and D is cultivated in symbiosis with the streptococcus from taette. The quantity inoculated is 5%, the temperature 38° to 39° C. Thickening is completed after a maximum of 90 minutes, consistency is better than in yoghourt. The streptococcus assumes the biological qualities of the intestinal types and activates their rapid reproduction.

By additionally inoculating the above-mentioned yeasts or oospora (which also derive from taette) additional vitamins may be formed, especially those belonging to the B complex. Lactose yeasts may also be used to influence taste by the formation of alcohol and carbon dioxide. Torulopsis or oospora fusther prolong the life of the cultures up to four months, on the one hand, by their neutralising power (utilisation of lactose in respiration or by means of the by-products of proteolysis) and, on the other hand, by the formation of growth factors for *Thermobacterium intestinale*. The additional inoculation of propionic acid bacteria has the effect of making the vitamin $B_{12}$ which is bound in the milk available for use by the Thermobacteria. The addition of traces of cobalt chloride enables further vitamine $B_{12}$ to be formed. If the taette streptococcus is inoculated at the same time, the coccal mucous, which consists principally of proteins, may bind some of the vitamin $B_{12}$ in such a way that it will only become available later to the intestinal mucous membrane itself.

Example 2

*Bacterium bifidum* is cultivated in cows' milk in symbiosis with propionic acid bacteria, the latter accelerating, if indeed not essential to, development, by making the vitamin $B_{12}$ available and by forming substances similar to bifidus factors. The inoculated dosage is 5% and the incubation temperature is 37° C.

The symbiosis of other bacteria may be effected by following the process of Example 1 obtaining similar results to those described.

We claim:

1. In a process for producing sour milk products prepared with the aid of a starter, the improvement wherein the starter is obtained by: (1) inoculating milk with about 5% of two microorganisms which have been freshly cultivated symbiotically, said microorganisms being (a) a strain of *Thermobacterium intestinale* and (b) *Streptococcus lactis* from taette, and (2) incubating said microorganisms in said milk at a temperature from about 38° to 39° C. for about 90 minutes whereby thickening of the milk is completed, the resulting thickened milk constituting said starter, the strain of *Thermobacterium intestinale* being originally segregated from mucous membranes, being Gram positive, possessing its original biological effective qualities as an intestinal variant expressed by maltose fermentation, tolerance to indole, skatole and phenol, and maintaining these qualities by symbiosis with *Streptococcus lactis* from taette.

2. In a process for producing sour milk products prepared with the aid of a starter, the improvement wherein the starter is obtained by: (1) inoculating milk with about 5% of two microorganisms which have been freshly cultivated symbiotically, said microorganisms being (a) an intestinal strain of *Bacterium bifidum* and (b) *Streptococcus lactis* from taette, and (2) incubating said microorganisms in said milk at a temperature from about 30° to about 50° C. for about 90 minutes whereby thickening of the milk is completed, the resulting thickened milk constituting said starter.

3. In a process for producing sour milk products prepared with the aid of a starter, the improvement wherein the starter is obtained by: (1) inoculating milk with about 5% of three microorganisms which have been freshly cultivated symbiotically, said microorganisms being (a) an intestinal strain of *Thermobacterium intestinale*, (b) an intestinal strain of *Bacterium bifidum*, and (c) *Streptococcus lactis* from taette, and (2) incubating said microorganisms in said milk at a temperature within the range from about 30° to 50° C. for about 90 minutes whereby thickening of the milk is completed, the resulting thickened milk constituting said starter.

4. In a process for producing sour milk products prepared with the aid of a starter, the improvement wherein the starter is obtained by: (1) adding a trace cobalt chloride to milk, (2) inoculating said milk with about 5% of a plurality of microorganisms which have been freshly cultivated symbiotically, one of said microorganisms being an intestinal strain selected from the group consisting of *Thermobacterium intestinale* and *Bacterium bifidum* and another of said microorganisms being a species selected from the group consisting of *Streptococcus lactis* from taette, *Bacterium acidi propionici*, Lactose-yeast and Torulopsis-yeast, and (3) incubating said microorganisms in said milk at a temperature ranging from 30° to 50° C. for about 90 minutes whereby thickening of the milk is completed, the resulting thickened milk constituting said starter.

5. In a process for producing sour milk products prepared with the aid of a starter, the improvement wherein the starter is obtained by: (1) inoculating said milk with about 5% of a plurality of microorganisms which have been freshly cultivated symbiotically, one of said microorganisms being an intestinal strain selected from the group consisting of *Thermobacterium intestinale* and *Bacterium bifidum* and another of said microorganisms being a species selected from the group consisting of *Streptococcus lactis* from taette, *Bacterium acidi propionici*, Lactose-yeast and Torulopsis-yeast, and (2) incubating said microorganisms in said milk at a temperature ranging from 30° to 50° C. for about 90 minutes whereby thickening of the milk is completed, the resulting thickened milk constituting said starter.

6. In a process for producing sour milk products prepared with the aid of a starter, the improvement wherein the starter is obtained by: (1) inoculating said milk with about 5% of a plurality of microorganisms which have been freshly cultivated symbiotically, one of said microorganisms being an intestinal strain of *Thermobacterium intestinale* and another of said microorganisms being *Bacterium acidi propionici*, and (2) incubating said microorganisms in said milk at a temperature ranging from 30° to 50° C. for about 90 minutes whereby thickening of the milk is completed, the resulting thickened milk constituting said starter.

7. In a process for producing sour milk products prepared with the aid of a starter, the improvement wherein the starter is obtained by: (1) inoculating said milk with about 5% of a plurality of microorganisms which have been freshly cultivated symbiotically, one of said microorganisms being an intestinal strain of *Thermobacterium intestinale* and another of said microorganisms being Lactose-yeast, and (2) incubating said microorganisms in said milk at a temperature ranging from 30° to 50° C. for about 90 minutes whereby thickening of the milk is completed, the resulting thickened milk constituting said starter.

8. In a process for producing sour milk products prepared with the aid of a starter, the improvement wherein the starter is obtained by: (1) inoculating said milk with about 5% of a plurality of microorganisms which have been freshly cultivated symbiotically, one of said microorganisms being an intestinal strain of *Thermobacterium intestinale* and another of said microorganisms being Torulopsis-yeast, and (2) incubating said microorganisms in said milk at a temperature ranging from 30° to 50° C. for about 90 minutes whereby thickening of the milk is completed, the resulting thickened milk constituting said starter.

9. In a process for producing sour milk products prepared with the aid of a starter, the improvement wherein the starter is obtained by: (1) inoculating said milk with about 5% of a plurality of microorganisms which have been freshly cultivated symbiotically, one of said microorganisms being an intestinal strain of *Bacterium bifidum* and another of said microorganisms being *Bacterium acidi propionici*, and (2) incubating said microorganisms in said milk at a temperature ranging from 30° to 50° C. for about 90 minutes whereby thickening of the milk is completed, the resulting thickened milk constituting said starter.

10. In a process for producing sour milk products prepared with the aid of a starter, the improvement wherein the starter is obtained by: (1) inoculating said milk with about 5% of a plurality of microorganisms which have been freshly cultivated symbiotically, one of said microorganisms being an intestinal strain of *Bacterium bifidum* and another of said microorganisms being Lactose-yeast, and (2) incubating said microorganisms in said milk at a temperature ranging from 30° to 50° C. for about 90 minutes whereby thickening of the milk is completed, the resulting thickened milk constituting said starter.

11. In a process for producing sour milk products prepared with the aid of a starter, the improvement wherein the starter is obtained by: (1) inoculating said milk with about 5% of a plurality of microorganisms which have been freshly cultivated symbiotically, one of said microorganisms being an intestinal strain of *Bacterium bifidum* and another of said microorganisms being Torulopsis-yeast, and (2) incubating said microorganisms in said milk at a temperature ranging from 30° to 50° C. for about 90 minutes whereby thickening of the milk is completed, the resulting thickened milk constituting said starter.

References Cited in the file of this patent

UNITED STATES PATENTS

| | | |
|---|---|---|
| 1,506,501 | Rettger et al. | Aug. 26, 1924 |
| 1,799,303 | Kulp | Apr. 7, 1931 |
| 1,899,817 | Matt | Feb. 28, 1933 |
| 2,119,599 | Nordsiek | June 7, 1938 |
| 2,162,449 | Thies | June 13, 1939 |
| 2,767,118 | Gaymont | Oct. 16, 1956 |
| 2,838,443 | Gillespie | June 10, 1958 |